United States Patent [19]

Schneider

[11] 3,803,718
[45] Apr. 16, 1974

[54] MEASURING INSTRUMENT
[75] Inventor: Thomas A. Schneider, Lombard, Ill.
[73] Assignee: House of Doors, Inc., Brookfield, Ill.
[22] Filed: Nov. 15, 1971
[21] Appl. No.: 198,540

[52] U.S. Cl. ............................. 33/107 R, 33/111
[51] Int. Cl. ............................................. G01b 3/04
[58] Field of Search...... 33/169 R, 125 R, 107, 111, 33/137 R

[56] References Cited
UNITED STATES PATENTS

| 867,730 | 10/1907 | Jeffreys | 33/107 R |
|---|---|---|---|
| 706,242 | 8/1902 | Latshaw | 33/111 |
| 882,022 | 3/1908 | Schmidt | 33/137 R |
| 975,689 | 11/1910 | Greenwood | 33/111 |
| 1,160,051 | 11/1915 | Deitz | 33/107 R |
| 344,721 | 6/1886 | Cheney | 33/111 |

FOREIGN PATENTS OR APPLICATIONS

| 48,373 | 1/1921 | Sweden | 33/169 R |
|---|---|---|---|
| 530,959 | 1/1922 | France | 33/111 |

Primary Examiner—John W. Huckert
Assistant Examiner—Milton S. Gerstein
Attorney, Agent, or Firm—Anthony S. Zummer

[57] ABSTRACT

A measuring instrument for determining the size of wire forming a helically wound spring. The measuring instrument includes a thin, flat, elongated body which has marking indicia on its outer surface. A hook is formed integral with one end of the body and is substantially perpendicular to the inner surface of the body. The marking indicia is calibrated in cooperation with the hook to indicate wire size when a selected number of coils of a helically wound spring is compressed against the hook.

1 Claim, 4 Drawing Figures

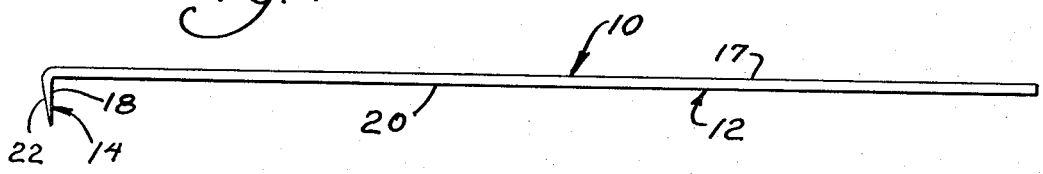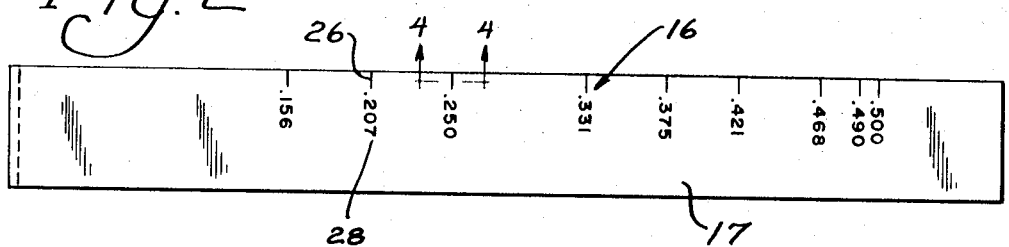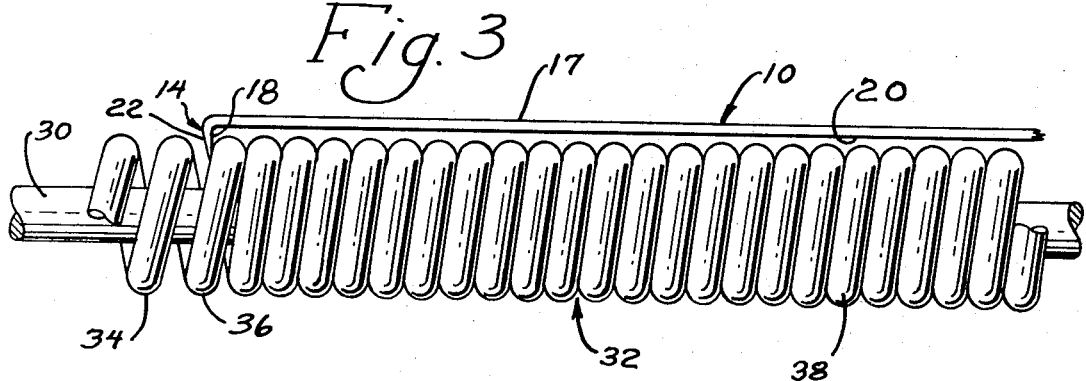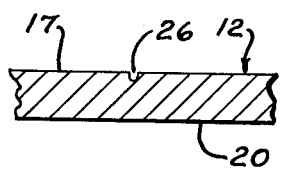

MEASURING INSTRUMENT

BACKGROUND OF THE INVENTION

In many applications, helically wound torsion springs are utilized for storing energy and then selectively releasing the energy. One of such applications is in operating overhead doors. Generally, there are two types of arrangements of spring loading overhead doors. One type of spring loading uses a tension spring, which utilizes cables in conjunction with a track for aiding in the operation of an overhead door. The other type of spring loading uses a torsion spring, which spring is mounted on an axle which in turn is connected to the overhead door for operating the door.

It may be readily appreciated that after a period of use, the springs, especially the torsion springs, often have fatigue failures. The failures are especially common when there is a rapid change in weather from hot to cold, and especially in very cold weather when the metal of the spring is brittle. When the spring breaks, it is necessary to replace the spring. Although some manufacturers provide replacement springs, in many instances, a door-operating mechanism is of such an age that the manufacturer may be out of business or the manufacturer may no longer supply the springs.

When it is necessary to replace a spring in a door operator, the replacement spring must duplicate the spring which was originally in the operator. It is a relatively simple matter to determine the number of coils in the spring, the spacing of the coils, and the overall length of the spring. One of the problems in determining the size of the spring is to determine the exact size of the wire which is used in forming the spring. It may be appreciated that usually the spring is not situated in an easily accessible location, and the broken spring cannot be removed until there is a replacement spring available because the amount of work is doubled if the old spring is removed and then the new spring is brought back and installed. It follows that it is much more economical to remove the old spring and install the new spring in one operation. In view of the fact that the size of the wire is critical for forming a spring which duplicates the old spring for proper operation of the door, the measurement must be taken quite carefully and accurately. Use of micrometers and other such tools is difficult in view of the fact that it is difficult to place a micrometer on a helically wound spring to get an accurate reading; and, of course, the ordinary workman who takes the measurements is not a skilled machinist, and he often has difficulty in reading a micrometer.

SUMMARY OF THE INVENTION

The instant invention provides a measuring instrument for use in determining the size of wire forming a helically wound spring. The instrument comprises an elongated, flat body having a plurality of indented lines along one edge of the body. An indicia is positioned adjacent to each of the indented lines, indicating a wire size. A beveled hook is formed integral with one end of the body, substantially perpendicular to the edge having the indented lines, and extends away from the side of the body having the marking indicia. The inside portion of the hook is spaced away from each of the lines so that twenty coils of a spring indicate the size of the wire when the twenty coils are compressed against the hook. It is therefore a principal object of this invention to provide a measuring instrument which may readily and conveniently determine the size of wire used in forming a helically wound spring by simply inserting a portion of the instrument between a pair of coils, compressing the spring, counting a prescribed number of coils, and then noting the wire size on the instrument.

It is another object of the instant invention to provide a measuring instrument for determining the size of a wire, which instrument may be easily and simply used in locations where a spring is not readily accessible and the amount of available light is minimal.

It is a further object of the present invention to provide a measuring instrument which is rugged and is economical to manufacture.

Other objects and uses of the instant invention will become readily apparent to those skilled in the art upon a perusal of the following specification in light of the accompanying drawing.

BRIEF DESCRIPTION OF THE DRAWINGS

FIG. 1 is a side elevational view of a measuring instrument embodying the present invention;

FIG. 2 is a plan view of the measuring instrument shown in FIG. 1;

FIG. 3 is a side elevational view of the measuring instrument shown in FIG. 1, positioned in engagement with a helically wound spring; and FIG. 4 is a cross-sectional view taken on line 4—4 of FIG. 2, showing one of the indented lines.

DESCRIPTION OF THE PREFERRED EMBODIMENT

Referring now to the drawing, a measuring instrument generally indicated by numeral 10 is shown therein. The measuring instrument 10 is made of a single piece of steel and generally includes an elongated, flat, thin body 12, a hook 14 formed integral with one end of the body, and marking indicia 16 on an exterior surface 17 of the body.

As was mentioned above, the flat, thin body 12 has the hook 14 formed integral therewith. The hook has an interior surface 18 which is formed integral with an inner surface 20 of the body 12. The hook also includes an exterior surface 22 which is beveled so that the free end of the hook comes to a fine edge to facilitate insertion of the hook between a pair of adjacent coils.

The marking indicia 16 on the exterior surface 17 includes a plurality of indented lines 26 which are appropriately spaced from the interior surface 18 of the hook. Adjacent to each of the indented lines 26 is an indicia 28 which indicates a wire size. For a given wire size, the distance from the indented line 26 to the interior surface 18 of the hook is the distance of twenty compressed coils of a spring being measured.

The measuring instrument 10 is shown in use in FIG. 3. In FIG. 3, an axle 30 is shown with a torsion helically wound spring 32 mounted thereon. The hook 14 is shown positioned between a pair of coils 34 and 36 of the spring 32. In order to determine the size of the wire, twenty coils are counted to coil 38. An indented line 26 adjacent to the side of coil 38 away from the hook 14 is noted and the indicia next to the line is also noted, thereby giving the size of the wire of the spring.

It may be appreciated that the instant instrument may be used in places where the coil spring is not readily accessible. The operator need only insert the hook 14 between a pair of coils and pull on the body 12 of the instrument to compress the coil spring. Once the spring is compressed, the operator need only count the coils to the twentieth coil. This may be done by the sense of touch so that the operator need not even see the coils. At the twentieth coil, the operator need only feel for an adjacent indented line and place a fingernail at the adjacent indented line. Holding the fingernail in the indented line, the operator then may release the coils and remove the instrument from engagement with the spring. Still holding the fingernail in place, the operator then may remove the instrument to a desired location to observe the indicia next to the marked line.

It may be noted that the present instrument is always in calibration as long as the body is flat; and even if there is a slight bend in the body, pulling the coil spring with the instrument flattens out the instrument to give a proper reading. The instrument may be dropped, nicked or abused in any manner which many workmen may do during the normal use of the instrument, but the instrument is still operative for determining the size of wire used in the spring.

Although a specific embodiment of the present measuring instrument has been shown and described in detail above, it is expressly understood that those skilled in the art may make various modifications and changes in the instrument without departing from the spirit and scope of the present invention. It is to be expressly understood that the present disclosure is made in compliance with the applicable patent laws requiring a disclosure of an embodiment of the invention and that the instant invention is limited only by the appended claims.

What is claimed is:

1. A measuring instrument for use in determining the size of wire forming a helically wound spring comprising; an elongated, flat, straight, relatively thin body; a hook formed integral with one end of said body and extending outward from one flat side of the body; said hook having an interior surface substantially perpendicular to said body and being formed integral with said one flat side of the body; said hook having the surface opposite the interior surface beveled to provide a taper from the body to a narrow portion at the free end of the hook to facilitate insertion of the hook between adjacent coils of a spring to be measured; a plurality of indented lines on the other flat side of the body and extending to the edge of said flat side; indicia adjacent to each of the indented lines; said indented lines and indicia being calibrated in cooperation with the interior surface of the hook for indicating wire size when a given number of coils of the spring are compressed against the hook so that the side of the last coil of the given number away from the interior surface of the hook is adjacent to an indented line indicating the wire size; and said body having a portion between the ends spaced away from the hook and the indicia for holding the instrument while pulling the hook toward said end to place adjacent coils between the hook and the last coil of the given number into tight engagement.

* * * * *